United States Patent
Fukuda et al.

(10) Patent No.: US 11,409,252 B2
(45) Date of Patent: Aug. 9, 2022

(54) VEHICLE CONTROL DEVICE AND VEHICLE CONTROL SIMULATION DEVICE

(71) Applicant: Hitachi Automotive Systems, Ltd., Hitachinaka (JP)

(72) Inventors: Takeshi Fukuda, Tokyo (JP); Toru Irie, Hitachinaka (JP); Takafumi Suzuki, Hitachinaka (JP); Takahiro Iida, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 389 days.

(21) Appl. No.: 16/620,762

(22) PCT Filed: Jun. 25, 2018

(86) PCT No.: PCT/JP2018/023942
§ 371 (c)(1),
(2) Date: Dec. 9, 2019

(87) PCT Pub. No.: WO2019/009114
PCT Pub. Date: Jan. 10, 2019

(65) Prior Publication Data
US 2020/0103839 A1    Apr. 2, 2020

(30) Foreign Application Priority Data
Jul. 6, 2017    (JP) .............................. JP2017-132367

(51) Int. Cl.
*G05B 17/02*    (2006.01)
*B60W 50/04*    (2006.01)
*H04L 67/12*    (2022.01)

(52) U.S. Cl.
CPC ............. *G05B 17/02* (2013.01); *B60W 50/04* (2013.01); *H04L 67/12* (2013.01)

(58) Field of Classification Search
CPC ......... G05B 17/02; B60W 50/04; H04L 67/12
See application file for complete search history.

(56) References Cited

U.S. PATENT DOCUMENTS

10,964,130 B1 *    3/2021    Dixit .................. G05B 23/0283
2007/0254772 A1 *    11/2007    Satou .................... F02P 5/1504
    477/107
(Continued)

FOREIGN PATENT DOCUMENTS

JP    H11-014507 A    1/1999
JP    2008-186057 A    8/2008
(Continued)

OTHER PUBLICATIONS

Office Action issued in corresponding Japanese Patent Application No. 2017-132367 dated May 25, 2021 with English translation.
(Continued)

*Primary Examiner* — Peter D Nolan
*Assistant Examiner* — Wae L Louie
(74) *Attorney, Agent, or Firm* — Foley & Lardner LLP

(57) ABSTRACT

The present invention provides a vehicle control device and a vehicle control simulation device that enable, even for parallel processing with a plurality of arithmetic devices, approximation in act between at verification of simulation operation on a model base and at verification of operation on an actual vehicle. Provided are: control model information for control of a system; hardware information for operation of a control model; arithmetic-device allocation information as to which arithmetic device in hardware is allocated to perform arithmetic processing to a control program in the control model; delay time information regarding a case where the control model operates on the hardware; and a delay-time adding unit configured to create delay-inclusive control model information in which the delay time information is inserted in the control model, based on at least either the arithmetic-device allocation information or the hardware information.

7 Claims, 6 Drawing Sheets

(56) References Cited

U.S. PATENT DOCUMENTS

| | | | |
|---|---|---|---|
| 2012/0102175 A1 | 4/2012 | Ito | |
| 2014/0081508 A1* | 3/2014 | Iida | G06F 11/1004 |
| | | | 701/29.2 |
| 2015/0378335 A1* | 12/2015 | Sata | G05B 17/02 |
| | | | 700/20 |
| 2016/0321037 A1* | 11/2016 | Ono | G06F 9/455 |
| 2017/0357560 A1* | 12/2017 | Fukuda | G06F 11/14 |

FOREIGN PATENT DOCUMENTS

| | | |
|---|---|---|
| JP | 2012-093899 A | 5/2012 |
| JP | 2016-207166 A | 12/2016 |
| WO | WO2014-129354 | 8/2014 |

OTHER PUBLICATIONS

Extended European Search Report issued in corresponding European Patent Application No. 18828170.3 dated Dec. 10, 2020.

Bucaioni et al., "Technology-Preserving Transition from Single-Core to Multi-Core in Modelling Vehicular Systems", Big Data Analytics in the Social and Ubiquitous Context: 5th International Workshop on Modeling Social Media, MSM 2014 / 5th International Workshop on Mining Ubiquitous and Social Environments (MUSE) 2014 / 1st International Workshop on Machine LE, pp. 285-299 (2017), Retrieved Jun. 20, 2017.

Macher et al., "Automotive Embedded Software: Migration Challenges to Multi-Core Computing Platforms", 2015 IEEE 13th International Conference on Industrial Informatics (INDIN), IEEE, Jul. 22, 2015, pp. 1386-1393.

International Search Report with English translation and Written Opinion issued in corresponding application No. PCT/JP2018/023942 dated Oct. 23, 2018.

Hashimoto et al., "Vehicle Guidance System by Using Outside Sensing", Technical report of the Institute of Image Information and Television Engineers, vol. 30 No. 14, 2006, pp. 47-51.

Matsubara et al., "Hierarchical Scheduling with Delayed Activation of Tasks for Temporal Protection", Proceeding Journal of Information Processing Society of Japan, 52, 2011, pp. 2387-2401.

* cited by examiner

| ID | LABEL | DATA DEPENDENT SOURCE FUNCTION | DATA DEPENDENT DESTINATION FUNCTION |
|---|---|---|---|
| 1 | LABEL 1 | FUNCTION 1 | FUNCTION 3 |
| 2 | LABEL 2 | FUNCTION 1 | FUNCTION 3 |
| 3 | LABEL 3 | FUNCTION 2 | FUNCTION 3 |

FIG. 6

| FUNCTION | ALLOCATION |
|---|---|
| FUNCTION 1 | ARITHMETIC DEVICE 1 |
| FUNCTION 2 | ARITHMETIC DEVICE 2 |
| FUNCTION 3 | ARITHMETIC DEVICE 2 |

| FUNCTION | DELAY TIME [$\mu$s] |
|---|---|
| FUNCTION 1 | 2.20 |
| FUNCTION 2 | 0.25 |
| FUNCTION 3 | 0.02 |

104

VEHICLE CONTROL DEVICE AND VEHICLE CONTROL SIMULATION DEVICE

TECHNICAL FIELD

The present invention relates to a vehicle control device and a vehicle control simulation device.

BACKGROUND ART

An embedded control device that controls a control target with so-called embedded software, is used in the technical field of automobiles, elevators, construction machines, and the like. Advantageously, such embedded software enables achievement of more flexible and advanced control than a conventional system with a mechanical mechanism or an electric circuit.

Such an embedded control device, for example, a control device in a vehicle controls an engine and brakes with a plurality of electronic control units (ECUs), to control the entirety of the vehicle. One ECU, such as an ECU for engine control, achieves intricate control with a plurality of built-in processor cores.

However, along with the complication of control, the development scale of embedded software increases. Thus, the man-hour necessary for design and verification of embedded software continuously increases. Regarding this problem, for improvement in the efficiency of development of a vehicle control device, known is the technology of embedded software development on a model base enabling design and verification with simulation without an actual ECU or engine. For example, PTL 1 discloses such technology.

Meanwhile, regarding an ECU that performs arithmetic processing to embedded software large scale, for increase of a program amount arithmetically processable per unit of time, a speed-up technique in which parallel processing is performed with a plurality of arithmetic devices, such as ECUs or processor cores, has been introduced. For a control device in a vehicle, known is the technology of parallelization in which a plurality of arithmetic devices efficiently processes a program for vehicle control. For example, PTL 2 discloses such technology.

CITATION LIST

Patent Literature

PTL 1: Japanese Patent Application No. H9-162169
PTL 2: Japanese Patent Application No. 2015-501402

SUMMARY OF INVENTION

Technical Problem

However, in the existing technology of software development with a model base, the influence of parallel processing with a plurality of arithmetic devices has not been considered. Thus, there is a large gap between embedded software designed on the model base and embedded software for parallel operation, implemented on ECUs, so that discrepancy is large between the embedded software designed on the model base and the actual-equipment performance, resulting in a problem.

More specifically, in the existing model-based development, the influence of synchronous processing time between pieces of arithmetic processing due to parallel processing with a plurality of arithmetic devices or the influence of delay time due to data communication between pieces of arithmetic processing have not been considered. Thus, disagreement occurs between at verification of simulation operation on the model base and at verification of operation on the actual vehicle, so that the performance estimated at design is not fulfilled, resulting in a problem.

The present invention has been made in consideration of the problem. An object of the present invention is to provide a vehicle control device and a vehicle control simulation device that enable, even for parallel processing with a plurality of arithmetic devices, approximation in act between at verification of simulation operation on a model base and at verification of operation on an actual vehicle.

Solution to Problem

In order to achieve the object, according to the present invention, provided are: control model information for control of a system; hardware information for operation of a control model; arithmetic-device allocation information as to which arithmetic device in hardware is allocated to perform arithmetic processing to a control program in the control model; delay time information regarding a case where the control model operates on the hardware; and a delay-time adding unit configured to create delay-inclusive control model information in which the delay time information is inserted in the control model, based on at least either the arithmetic-device allocation information or the hardware information.

Advantageous Effects of Invention

According to the present invention, even in a case where parallel processing is performed with a plurality of arithmetic devices, an approximation can be made in act between simulation operation on a model base and operation on an actual vehicle. Thus, the man-hour in development can be reduced.

BRIEF DESCRIPTION OF DRAWINGS

FIG. 6 is a data table of arithmetic-device allocation according to the embodiment of the present invention.

FIG. 7 is a data table of delay time according to the embodiment of the present invention.

DESCRIPTION OF EMBODIMENTS

The present embodiment relates to an embedded system including a computer system embedded for achievement of a specific function of a product requiring electronic control, such as household equipment, industrial equipment, or medical equipment. Particularly, the present embodiment relates to a vehicle control device and a vehicle control simulation device each that control a system with a plurality of arithmetic devices, for example, a system in which required functions are various, for transport equipment, such as automobiles, railways, and elevators, or a large-scale system having a combination of a plurality of pieces of hardware and a plurality of pieces of software.

An embodiment of the present invention will be described below with reference to the drawings. Note that, for convenience, one ECU is a target in the embodiment. However, the effect of the present invention is not limited to the inside of the ECU.

Figure 1:
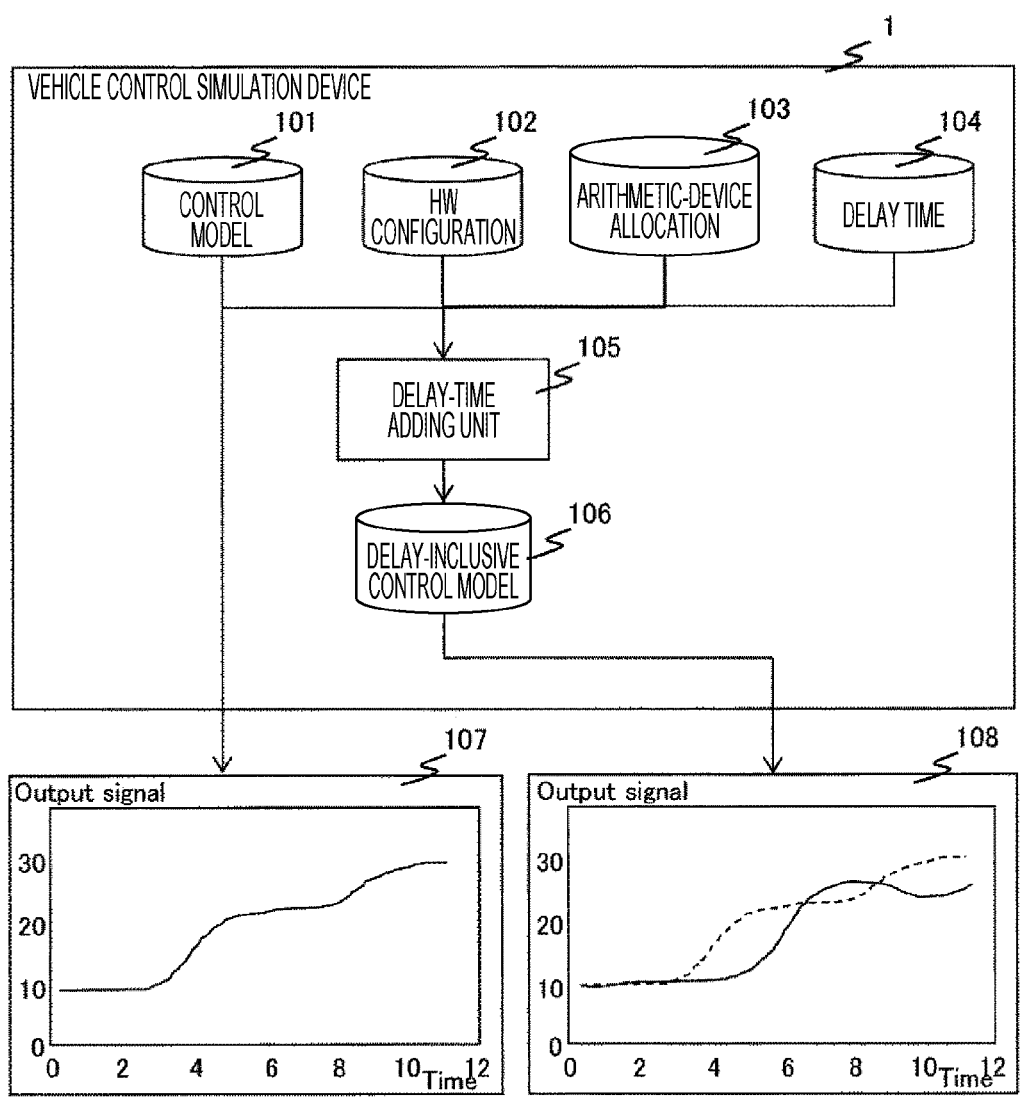
FIG. 1 is a system block diagram of a vehicle control simulation device according to an embodiment of the present invention.

FIG. 1 is a system block diagram of a vehicle control simulation device according to the embodiment of the present invention. The vehicle control simulation device 1 includes a control model 101, an HW configuration 102, arithmetic-device allocation 103, delay time 104, and a delay-time adding unit 105. The delay-time adding unit 105 generates a delay-inclusive control model 106, on the basis of the control model 101, the HW configuration 102, the arithmetic-device allocation 103, and the delay time 104.

Here, in comparison to a waveform chart 107 indicating a simulation result based on the control model 101 before application of the present embodiment, a waveform chart 108 indicating a simulation result based on the delay-inclusive control model 106 after application of the present embodiment, indicates that the waveform has changed due to the influence of the delay time 104.

Figures 2, 3:
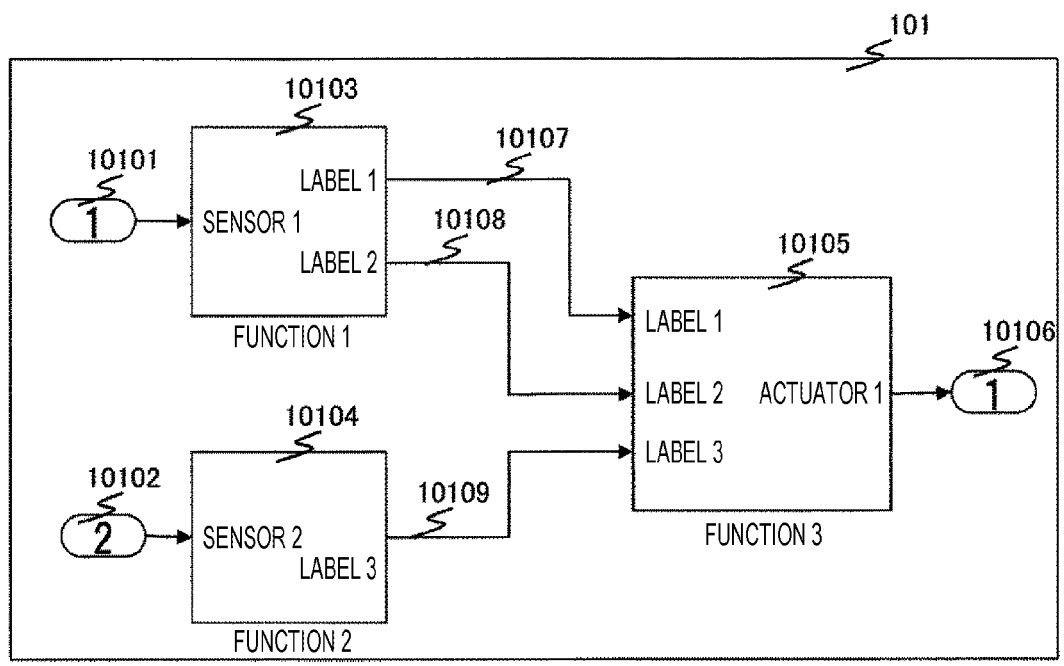
FIG. 2 is a model diagram of a control model according to the embodiment of the present invention.
FIG. 3 is a data table of the control model according to the embodiment of the present invention.

FIG. 2 is a model diagram of the control model according to the embodiment of the present invention. The control model 101 includes input ports 10101 and 10102, an output port 10106, and functional blocks 10103, 10104, and 10105. Transmission and reception of label information 1 and label information 2 are indicated between the functional block 10103 and the functional block 10105 through wiring lines 10107 and 10108 indicating data dependent relationship. Similarly, transmission and reception of label information 3 are performed between the functional block 10104 and the functional block 10105 through a wiring line 10109 indicating data dependent relationship.

The functional block 10103 inputs sensor information from the input port 10101, and outputs the label 1 information and the label 2 information to the functional block 10105. The functional block 10104 inputs sensor 2 information from the input port 10102, and outputs the label 3 information to the functional block 10105. Then, the functional block 10105 inputs the label 1 information and the label 2 information output from the functional block 10103 and the label 3 information output from the functional block 10104, and outputs actuator 1 information to the output port 10106.

FIG. 3 is a data table of the control model according to the embodiment of the present invention. The data table 1011 of the control model includes information regarding ID, label, data dependent source function, and data dependent destination function. Specifically, the data table 1011 indicates the data dependent source function and the data dependent destination function of the label 1, label 2, and label 3 information to be transmitted and received between the functional blocks 10103, 10104, and 10105 indicated in the control model 101. For example, for the label 1 with ID 1, the data dependent source function indicates a function 1 that is the functional block 10103 in the control model 101, and the data dependent destination function indicates a function 3 that is the functional block 10105 in the control model 101.

Figures 4, 5:
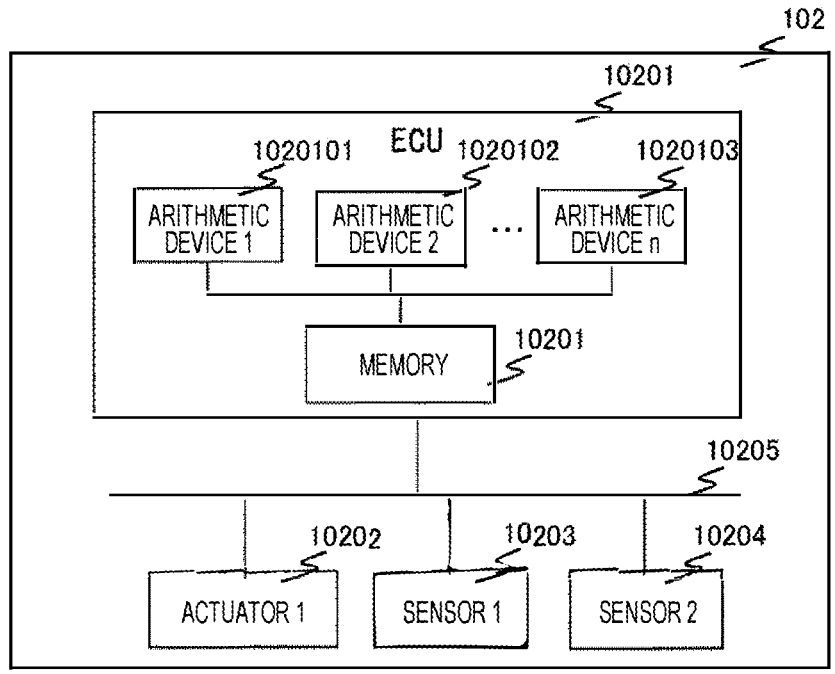
FIG. 4 is block diagram of an HW configuration according to the embodiment of the present invention.
FIG. 5 is a data table of the HW configuration according to the embodiment of the present invention.

FIG. 4 is a block diagram of the HW configuration according to the embodiment of the present invention. The HW configuration 102 indicates an HW configuration for arithmetic processing of control software written in the control model 101. The HW configuration 102 includes an ECU 10201, an actuator 10202, sensors 10203 and 10204, and a bus 10205. The ECU 10201 includes arithmetic devices 1020101, 1020102, and 1020103, and a memory 10201.

FIG. 5 is a data table of the HW configuration according to the embodiment of the present invention. The data table 1021 of the HW configuration includes data dependent source, data dependent destination, and delay determination information.

Specifically, the data table 1021 includes the delay determination information that is criterial for determination of whether delay occurs in data communication between the arithmetic devices 1020101, 1020102, and 1020103. For example, in a case where the arithmetic device 1020101 is an arithmetic device 1 indicated as the data dependent source and the arithmetic device 1020101 is the arithmetic device 1 indicated as the data dependent destination, the data table 1021 indicates that no delay time occurs because the delay determination indicates no delay. Meanwhile, in a case where the arithmetic device 1020101 is the arithmetic device 1 indicated as the data dependent source and the arithmetic device 1020103 is an arithmetic device n indicated as the data dependent destination, the data table 1021 indicates that delay time occurs because the delay determination indicates delay.

FIG. 6 is a data table of the arithmetic-device allocation according to the embodiment of the present invention.

The data table 103 of the arithmetic-device allocation includes function and allocation information. Specifically, the data table 103 indicates which arithmetic device indicated in the HW configuration 102 performs arithmetic processing to each function indicated in the control model 101. For example, the data table 103 indicates that the functional block 10103 indicated as the function 1 in the control model 101 is to be subjected to arithmetic processing by the arithmetic device 1020101 indicated as the arithmetic device 1 in the HW configuration 102. Similarly, the data table 103 indicates that the functional block 10104 indicated as the function 2 in the control model 101 is to be subjected to arithmetic processing by the arithmetic device 1020102 indicated as the arithmetic device 2 in the HW configuration 102.

FIG. 7 is a data table of the delay time according to the embodiment of the present invention. The data table 104 of the delay time includes function and delay time information. Specifically, the data table 104 indicates the processing time necessary in a case where each function indicated in the control model 101 is subjected to the arithmetic processing by the arithmetic device in the HW configuration 102. For example, in a case where the functional block 10103 indicated as the function 1 in the control model 101 is processed by the arithmetic device in the HW configuration 102, the data table 104 indicates that the processing time is 2.20 µs.

Figure 8:
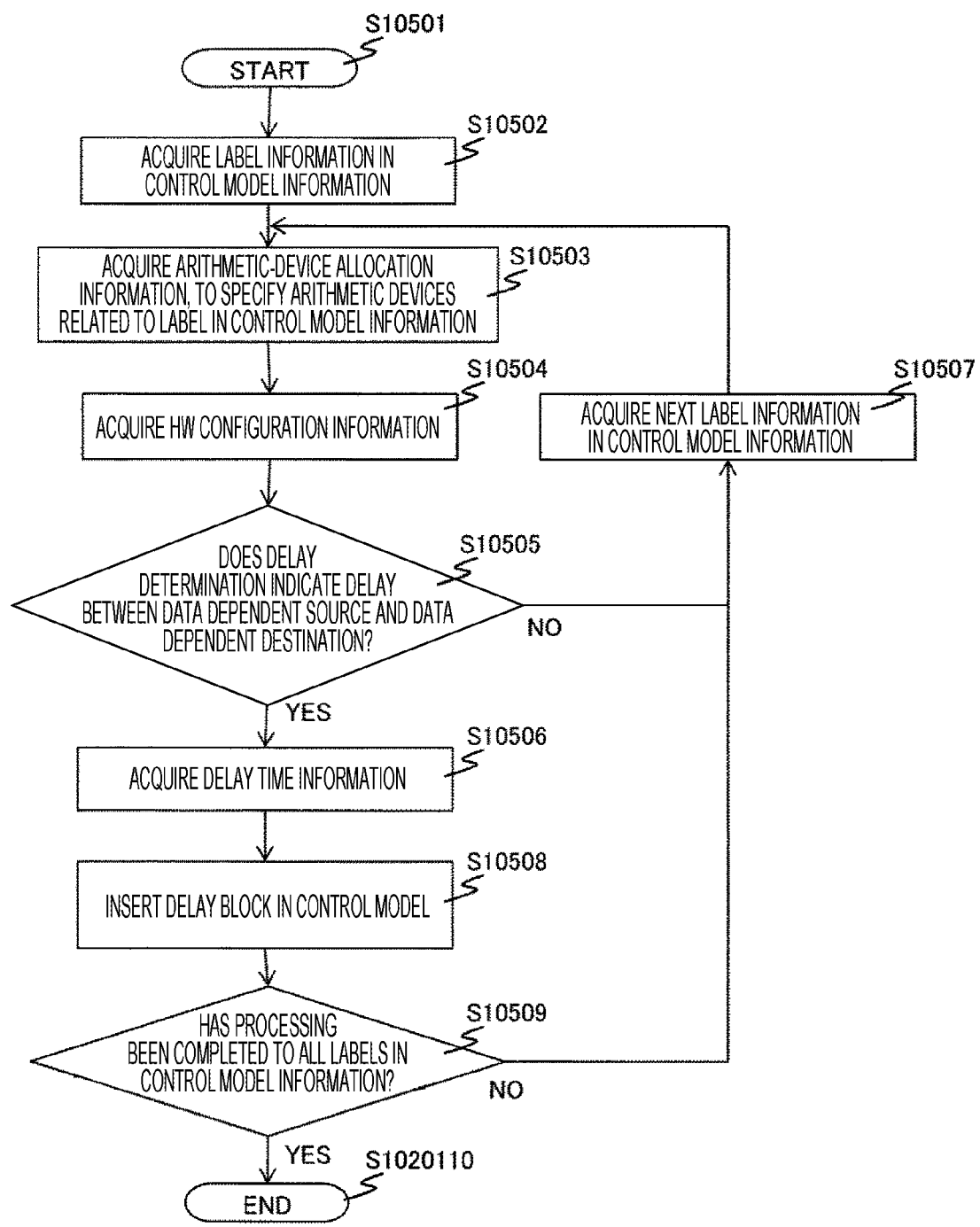
FIG. 8 is a flowchart of the act of a delay-time adding unit according to the embodiment of the present invention.

FIG. 8 is a flowchart of the act of the delay-time adding unit according to the embodiment of the present invention. The delay-time adding unit 105 generates the delay-inclusive control model 106 in which the delay information 104 is added to the control model 101, on the basis of the HW configuration 102, the arithmetic-device allocation 103, and the delay time 104 information. As indicated in the flowchart, the processing starts from step S10501 as the act of the delay-time adding unit 105. At step S10502, label information in the control model 1011 is acquired and then the data dependent source function and the data dependent destination function related to the label are specified. At step S10503, the arithmetic-device allocation 103 is acquired, and then it is specified to which arithmetic devices the data dependent source function and the data dependent destination function related to the label in the control model information are allocated. At step S10504, the HW configuration 1021 information is acquired, and then it is specified whether the delay determination indicates delay or no delay, from a combination of the arithmetic devices to which the data dependent source function and the data dependent destination function related to the label in the control model information are allocated. At step S10505, it is determined whether the delay determination indicates delay or no delay, from the combination of the arithmetic devices to which the data dependent source function and the data dependent destination function related to the label are allocated. For YES, the processing proceeds to step S10506. For NO, the processing proceeds to step S10507. At step S10506, the delay time information from the delay time 104 is acquired, and then the delay time necessary for arithmetic processing of the data dependent source function related to the label, is specified. At step S10508, a delay block based on the delay time 104 information is inserted in the wiring portion related to the label in the delay model 101. At step S10509, it is determined whether the determination at step S10505 has been performed to all the labels in the control model 1011. For YES, the processing proceeds to step S1020110, to finish.

For NO, the processing proceeds to step S10507, to continue. At step S10507, the data dependent source function and the data dependent destination function related to the next label in the control model 1011, are specified.

Figure 9:
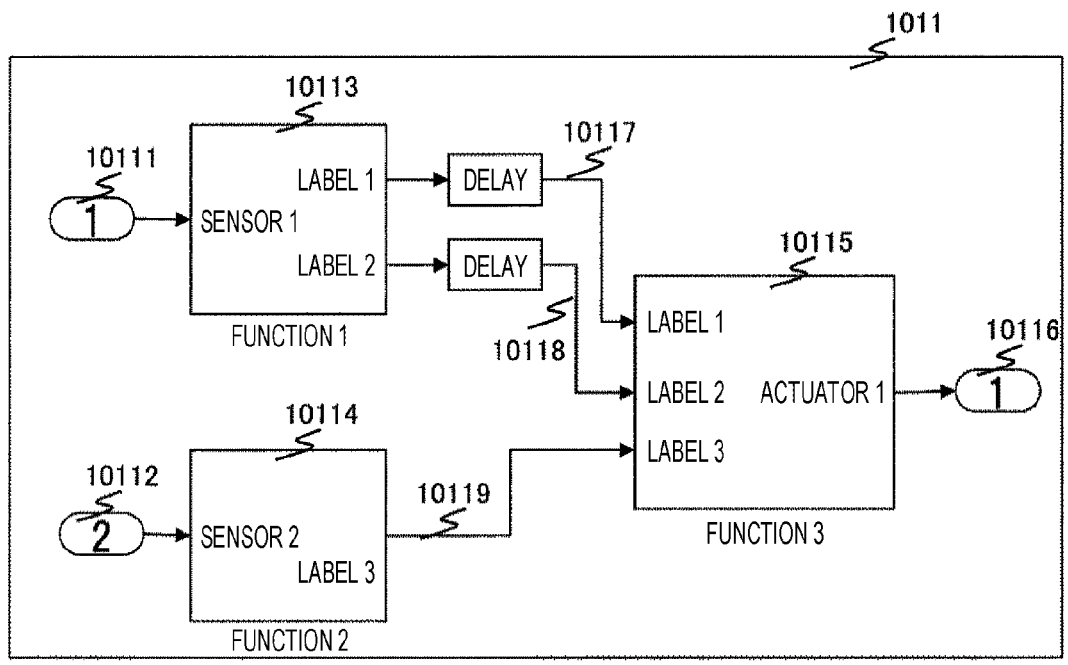
FIG. 9 is a model diagram of a delay-inclusive control model according to the embodiment of the present invention.

FIG. 9 is a model diagram of the delay-inclusive control model according to the embodiment of the present invention. The delay-inclusive control model 1011 results from addition of the delay time 104 to the control model 101 by the delay-time adding unit 105. The present embodiment indicates the result of addition of the delay time information to wiring lines 10117 and 10118 related to the label 1 and the label 2 to be subjected to data transmission and reception between a functional block 10113 and a functional block 10115.

Figure 10:
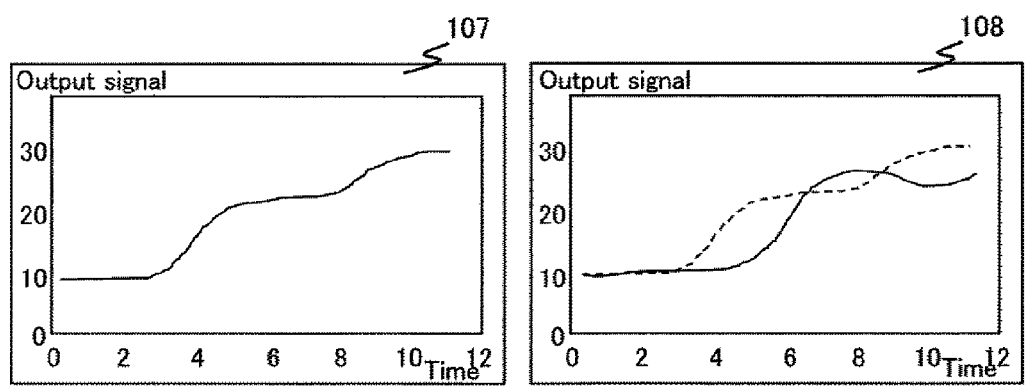
FIG. 10 illustrates waveform charts of simulation results of the control model and the delay-inclusive control model according to the embodiment of the present invention.

FIG. 10 illustrates waveform charts of simulation results of the control model and the delay-inclusive control model according to the embodiment of the present invention. The waveform chart 108 indicating the simulation result of the delay-inclusive control model 1011, clearly indicates that the waveform has changed because of the insertion of the delay blocks, in comparison to the waveform chart 107 indicating the simulation result of the control model 101.

This arrangement enables taking account of the influence of the synchronous processing time between pieces of arithmetic processing due to parallel processing with a plurality of arithmetic devices or the influence of delay time due to data communication between pieces of arithmetic processing, having not been considered in the existing model-based development. Thus, disagreement is inhibited from occurring between at verification of simulation operation on a model base and at verification of operation on an actual vehicle, so that the performance estimated at design can be secured.

REFERENCE SIGNS LIST

1 vehicle control simulation device
101 control model
102 HW configuration
103 arithmetic-device allocation
104 delay time
105 delay-time adding unit
106 delay-inclusive control model
107 waveform chart
108 waveform chart

The invention claimed is:
1. A vehicle control device comprising:
control model information for control of a system;
hardware information for operation of a control model;
arithmetic-device allocation information as to which arithmetic device in hardware is allocated to perform arithmetic processing to a control program in the control model;
delay time information regarding a case where the control model operates on hardware; and
a delay-time adding unit configured to create delay-inclusive control model information in which the delay time information is inserted in the control model, based on at least either the arithmetic-device allocation information or the hardware information.

2. The vehicle control device according to claim 1, wherein the delay-time adding unit inserts the delay time information, among combinations of functional blocks in the control model, into a combination of functional blocks in which the respective allocated arithmetic devices are different, based on at least the arithmetic-device allocation information and the hardware information.

3. The vehicle control device according to claim 1, wherein the hardware information includes at least either information regarding a plurality of system controller units or information regarding a communication line through which a storage device and the system controller units are connected.

4. The vehicle control device according to claim 1, wherein the hardware information includes at least either information regarding a plurality of processor cores or information regarding a communication line through which a storage device and the processor cores are connected.

5. The vehicle control device according to claim 1, wherein the delay time information includes at least either information regarding time necessary for synchronous processing between a plurality of arithmetic devices or information regarding time necessary for data communication between a plurality of arithmetic devices.

6. The vehicle control device according to claim 1, wherein the delay time information is probability distribution information regarding delay time in a case where the control model operates on the hardware a plurality of times.

7. A vehicle control simulation device comprising:
control model information for control of a system;
hardware information for operation of a control model;
arithmetic-device allocation information as to which arithmetic device in hardware is allocated to perform arithmetic processing to a control program in the control model;
delay time information regarding a case where the control model operates on the hardware; and
a delay-time adding unit configured to create delay-inclusive control model information in which the delay time information is inserted in the control model, based on at least either the arithmetic-device allocation information or the hardware information.

* * * * *